Aug. 9, 1949. H. D. STAHLER 2,478,430
CAGED ANIMAL FEEDING TRAY
Filed Feb. 14, 1947
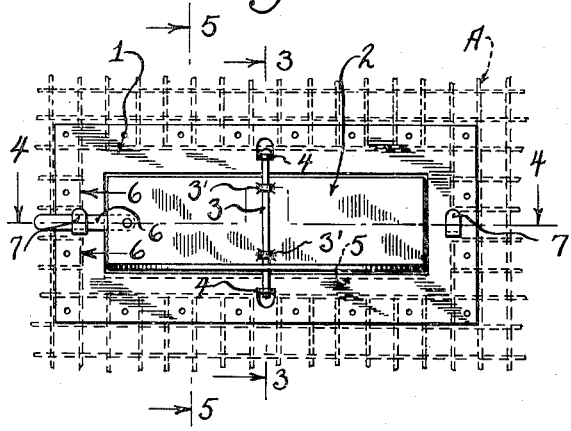
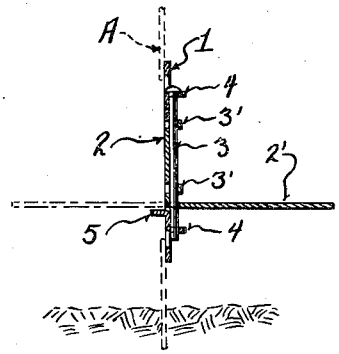
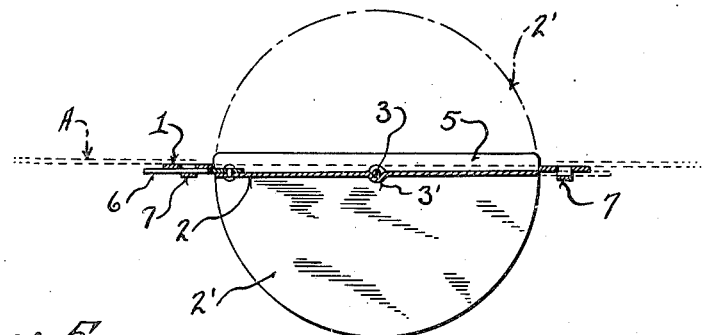
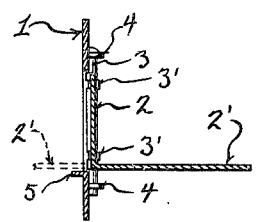
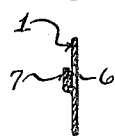
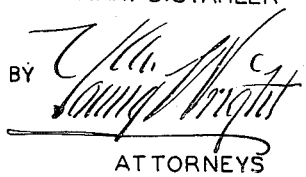
INVENTORS
HARRY D. STAHLER
BY
ATTORNEYS

UNITED STATES PATENT OFFICE 2,478,430

CAGED ANIMAL FEEDING TRAY

Harry Donald Stahler, Berlin, Wis.

Application February 14, 1947, Serial No. 728,439

1 Claim. (Cl. 119—18)

My invention refers to caged animal feeding trays particularly applicable for feeding mink or the like.

The object of my invention is to provide a rectangular frame attachable about an opening in the cage, the frame having a vertically disposed gate for closing the frame opening. The lower edge of said gate is merged into a semicircular horizontally disposed tray. The gate has centrally secured thereto a rod that is pivotally connected to the upper and lower stretches of the frame whereby the combined gate and tray may be rotated to present the tray to the outside of the cage or to the inside for feeding purposes. The side stretches of the frame are provided with offset tongues adapted to engage a lock and release bar carried at one end of the gate.

Thus, when it is desired to feed the animals, the food is dropped upon the trays exteriorly of the cages and thereafter the series of trays and their associated gates, are rotated one-half turn to present the food upon the trays within the cages, it being understood that the gates and trays are then locked in their feeding positions.

Briefly, the feeding tray simply embodies a two-part structure comprising a skeleton frame having a rectangular opening therein and a tray having one edge folded up to form a gate closure for the frame opening. A third element comprises a locking bar projecting from the gate flange, whereby the said gate is aligned within its opening in a loading and feeding position.

By this simple and sanitary feeding means it will be noted that the trays may be quickly cleansed when they are exposed outside of the cages in a row by a simple manual sweeping operation.

With the above and other objects in view, which will appear as the description proceeds the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Figure 1 represents a diagrammatic plan view of a group of cages equipped with feeding trays embodying my invention.

Figure 2 is an enlarged detailed face view of one of the trays embodying the features of my invention, the wire screen about the cage being indicated by dotted lines.

Figure 3 is a cross section of the tray the section being indicated by line 3—3 of Figure 2.

Figure 4 is a sectional plan view of the tray, the section being indicated by line 4—4 of Figure 2.

Figure 5 is a cross section of the same, the section being indicated by line 5—5 of Figure 2.

Figure 6 is a fragmentary sectional view through the lock and release mechanism, the section being indicated by line 6—6 of Figure 2.

Referring by characters to the drawings, with special reference to Figures 2-6 inclusive, A indicates the wire screen front wall of a cage having an opening therein.

Secured to the edges of the wire screen opening is a rectangular frame 1 having apertures therein for the purpose of intermeshing the wire screening by rivets whereby said frame is secured about the opening.

Loosely fitted into the rectangular opening of the frame is a vertically disposed gate flange 2, the lower edge of which gate has extended therefrom a horizontally positioned semi-circular feeding tray 2'.

Centrally positioned, with reference to the gate, is a pivot rod 3, which rod, for convenience in construction, is passed through and secured to loops 3' offset from the gate face. The projecting ends of the pin 3 are journaled in apertured lips 4 which lips are punched outwardly from the upper and lower stretches of the frame.

The lower edge opening of the frame 1 is provided with an inwardly extended flange 5 which serves as a strengthening element and also as a support for the tray when the same is swung to its inward feeding position, as indicated in dotted lines of Figure 3 of the drawings.

One end portion of the gate has pivoted thereto a locking bar 6, which locking bar serves to engage either one of a pair of tongues 7—7 offset from the end stretches of the frame 1.

As shown in Figures 2-5 inclusive, of the drawings, the combined gate and tray are locked in their position outside of the cage. Thus in their exposed open position, a series of these trays may be quickly supplied with a bulk of the animal's feed as the attendant travels from one to the other.

Thereafter the food is made accessible to the animals within the cages by simply unlocking the gate and swinging the same from left to right, whereby the said gate again closes the frame opening and being given a one-half turn, the tray, as indicated in dotted lines, is exposed within the cage or cages for feeding purposes, it being noted thereafter that said tray or trays are then locked in the reverse position by the opposite tongue which is then engaged by the locking bar.

It will also be noted that for sanitary purposes, the trays, when exposed in a line outside of the cages, may all quickly be cleansed or brushed off by the attendant traveling from one to the other.

I claim:

In an animal cage having a rectangular opening therein, a skeleton frame having an opening therein secured to the cage and coinciding with the cage opening, apertured ears extending from the skeleton frame midway between the ends of the frame opening, a one-piece feeding tray having a semi-circular tray portion and a rectangular gate extending upwardly from the straight edge of the semi-circular tray portion and movable selectively to a feeding position and a loading position, the rectangular gate being of the same area as the frame opening whereby the frame opening is closed by the rectangular gate when the tray is in loading or feeding position, loops offset from the tray gate and positioned midway between the ends thereof, a pivot rod engaging the frame ears and gate loops, said skeleton frame having an integral flange extending from the plane of the frame at the bottom edge of the frame opening to form a load support for said tray when it is swung into its feeding position.

HARRY DONALD STAHLER.

REFERENCES CITED

The following references are of record in the file of this patent:

UNITED STATES PATENTS

| Number | Name | Date |
|---|---|---|
| 1,602,000 | Custer | Oct. 5, 1926 |
| 1,869,901 | Le Fever | Aug. 2, 1932 |

FOREIGN PATENTS

| Number | Country | Date |
|---|---|---|
| 32,327 | Sweden | Feb. 17, 1912 |
| 83,250 | Switzerland | Nov. 17, 1919 |
| 355,863 | Great Britain | Sept. 3, 1931 |
| 464,942 | Great Britain | Apr. 28, 1937 |